(12) United States Patent
Medalion et al.

(10) Patent No.: US 11,551,282 B2
(45) Date of Patent: Jan. 10, 2023

(54) SYSTEM, METHOD, AND COMPUTER-READABLE MEDIUM FOR CAPACITY-CONSTRAINED RECOMMENDATION

(71) Applicant: Intuit Inc., Mountain View, CA (US)

(72) Inventors: Shlomi Medalion, Lod (IL); Sigalit Bechler, Bney-Zion (IL); Oren Sar Shalom, Nes Ziona (IL); Guy Maman, Hod Hasharon (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 16/940,087

(22) Filed: Jul. 27, 2020

(65) Prior Publication Data
US 2022/0027975 A1    Jan. 27, 2022

(51) Int. Cl.
| | | |
|---|---|---|
| *G06Q 30/00* | (2012.01) | |
| *G06Q 30/06* | (2012.01) | |
| *G06F 16/9536* | (2019.01) | |

(52) U.S. Cl.
CPC ..... *G06Q 30/0631* (2013.01); *G06F 16/9536* (2019.01); *G06Q 30/0617* (2013.01); *G06Q 30/0641* (2013.01)

(58) Field of Classification Search
CPC ...... G06Q 30/0601–0645; G06Q 30/08; G06F 16/9536
USPC .................................................. 705/26.1–27.2
See application file for complete search history.

(56) References Cited

U.S. PATENT DOCUMENTS

| | | | | |
|---|---|---|---|---|
| 10,810,540 | B1* | 10/2020 | Gopal | G01G 19/42 |
| 2005/0096997 | A1* | 5/2005 | Jain | G06Q 30/0601 |
| | | | | 705/26.1 |
| 2010/0262602 | A1* | 10/2010 | Dumon | G06Q 30/0623 |
| | | | | 707/E17.108 |
| 2011/0213651 | A1* | 9/2011 | Milana | G06Q 30/02 |
| | | | | 705/14.25 |
| 2012/0066243 | A1* | 3/2012 | Jammalamadaka | G06F 16/954 |
| | | | | 707/759 |

(Continued)

OTHER PUBLICATIONS

SciForce, "Inside recommendations: how a recommender system recommends", Feb. 7, 2020, Medium.com, accessed at [https://medium.com/sciforce/inside-recommendations-how-a-recommender-system-recommends-9afc0458bd8f] (Year: 2020).*

(Continued)

*Primary Examiner* — Jeffrey A. Smith
*Assistant Examiner* — Lindsey B Smith
(74) *Attorney, Agent, or Firm* — Paradice & Li LLP (57) ABSTRACT

This disclosure provides systems, methods and apparatuses for recommending items to users of a recommendation system. In some implementations, the recommendation system determines a plurality of contribution values based on interactions between a plurality of users and a plurality of items. Each of the plurality of contribution values represents a confidence level that a respective user prefers a respective item. The recommendation system further determines a capacity of each of the plurality of items. The capacity of each item represents a maximum number of users to which the item can be recommended. The recommendation system recommends one or more items of the plurality of items to each of the plurality of users based at least in part on the plurality of contribution values and the capacities of the plurality of items.

20 Claims, 9 Drawing Sheets

(56) References Cited

U.S. PATENT DOCUMENTS

| | | | | |
|---|---|---|---|---|
| 2012/0185359 | A1* | 7/2012 | Chen | G06F 16/245 |
| | | | | 705/26.63 |
| 2013/0218914 | A1* | 8/2013 | Stavrianou | G06F 16/3329 |
| | | | | 707/755 |
| 2017/0098197 | A1* | 4/2017 | Yu | G16H 10/60 |
| 2018/0204113 | A1* | 7/2018 | Galron | G06Q 30/0631 |

OTHER PUBLICATIONS

He et al., "Neural Collaborative Filtering," Proceedings of the 26th International Conference on World Wide Web, pp. 173-182, Apr. 2017.

Hu et al., "Collaborative Filtering for Implicit Feedback Datasets," 2008 Eigth IEEE International Conference on Data Mining, Pisa, pp. 263-272, 2008.

Rendle et al., "BPR: Bayesian Personalized Ranking from Implicit Feedback," Proceedings of the Twenty-Fifth Conference on Uncertainty in Artificial Intelligence, UAI 2009, pp. 452-461, 2009.

Wikipedia, "Greedy Algorithm," Retrieved from the internet <URL: https://en.wikipedia.org/w/index.php?title=Greedy_algorithm&oldid=948701526>, 8-pages, last edited on Apr. 2, 2020.

Wikipedia, "Monte Carlo Method," Retrieved from the internet <URL: https://en.wikipedia.org/w/index.php?title=Monte_Carlo_method&oldid=949099970>, 28-pages, last edited on Apr. 4, 2020.

* cited by examiner

SYSTEM, METHOD, AND COMPUTER-READABLE MEDIUM FOR CAPACITY-CONSTRAINED RECOMMENDATION

TECHNICAL FIELD

This disclosure relates generally to recommendation systems, and specifically to recommendation systems that are constrained by item capacity.

DESCRIPTION OF RELATED ART

Recommendation systems are used in many electronic systems and services (such as e-commerce, media streaming, crowdsourcing services, and the like) to recommend content, products, or services to users based on the users' tastes and preferences. Some recommendation systems determine the tastes and preferences of its users based on explicit feedback from the users. For example, users may submit ratings based on their experiences or interactions with certain items (including vendors or providers of content, products, or services). Such user ratings tend to provide highly accurate indications of the users' tastes and preferences. Other recommendation systems infer the tastes and preferences of its users based on implicit feedback from the users. For example, the recommendation system may monitor user interactions with individual items. The frequency of interactions between a user and a given item may be an indication of the likelihood that the user prefers that item. A recommendation system may further recommend, to each user, items that match the tastes and preferences of the user. For example, the recommendation system may determine a degree of similarity between the preferred items for a given user and other items that are similar to the preferred items (such as vendors or providers of similar content, products, or services). The recommendation provided to each user typically includes the highest-matching items for that user.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods and devices of this disclosure each have several innovative aspects, no single one of which is solely responsible for the desirable attributes disclosed herein.

One innovative aspect of the subject matter described in this disclosure can be implemented as a method of recommending items to users of a recommendation system. In some implementations, the method may include steps of determining a plurality of contribution values based on interactions between a plurality of users and a plurality of items, where each of the plurality of contribution values represents a preference of a respective user for a respective item; determining a capacity of each of the plurality of items, where the capacity of each item represents a maximum number of users to which the item can be recommended; and recommending one or more items of the plurality of items to each of the plurality of users based at least in part on the plurality of contribution values and the capacities of the plurality of items.

Another innovative aspect of the subject matter described in this disclosure can be implemented in a recommendation system. The recommendation system may include one or more processors and a memory storing instructions for execution by the one or more processors. In some implementations, execution of the instructions causes the recommendation system to perform operations including determining a plurality of contribution values based on interactions between a plurality of users and a plurality of items, where each of the plurality of contribution values represents a preference of a respective user for a respective item; determining a capacity of each of the plurality of items, where the capacity of each item represents a maximum number of users to which the item can be recommended; and recommending one or more items of the plurality of items to each of the plurality of users based at least in part on the plurality of contribution values and the capacities of the plurality of items.

Another innovative aspect of the subject matter described in this disclosure can be implemented as a method for recommending items to users of a recommendation system. In some implementations, the method may include steps of determining a plurality of contribution values based on interactions between a plurality of users and a plurality of items, where each of the plurality of contribution values represents a preference of a respective user for a respective item; determining a recommendation limit associated with the recommendation system, where the recommendation limit represents a maximum number of items that can be recommended to each of the plurality of users; determining a capacity of each of the plurality of items, the capacity of each item representing a maximum number of users to which the item can be recommended; and recommending one or more items of the plurality of items to each of the plurality of users based at least in part on the plurality of contribution values, the recommendation limit, and the capacities of the plurality of items.

BRIEF DESCRIPTION OF THE DRAWINGS

The example implementations are illustrated by way of example and are not intended to be limited by the figures of the accompanying drawings. Like numbers reference like elements throughout the drawings and specification.

DETAILED DESCRIPTION

Implementations of the subject matter described in this disclosure may be used to recommend items to users of a recommendation system. As discussed above, a recommendation system may determine the tastes and preferences of its users based on past interactions between the users and a set of items. The recommendation system may then recommend, to each user, the highest-matching items based on the tastes and preferences of that user. Many existing recommendation systems generate localized recommendations on a per-user basis. In other words, the recommendations generated for an individual user are independent of the recommendations generated for all other users of the recommendation system. Aspects of the present disclosure recognize that vendors or providers of content, products, or services may have limited bandwidth or capacity with respect to the number of users they can serve. If user demand for a particular vendor exceeds the vendor's capacity, the vendor may be unable to deliver the quality or quantity of content, products, or services expected by the users, resulting in user dissatisfaction and loss of business for the vendor.

In the present implementations, a recommendation system may match vendors to users based, at least in part, on the capacities of the vendors. More specifically, the recommendation system may not recommend a given vendor to more users than that vendor has a capacity to serve. As a result, the vendors recommended to a given user may depend on (or affect) the vendors recommended to other users of the recommendation system. For example, if five users match highly with a particular vendor, but the vendor can only serve four users at any given time, at least one of the users will not be recommended one of its highest-matching vendors. Accordingly, aspects of the present disclosure may recommend vendors to users in accordance with a global optimization scheme. Unlike the localized recommendation schemes implemented by existing recommendation systems, the global optimization scheme takes into account the capacity of each vendor, as well as the matching vendors associated with other users, in determining which vendors to recommend to a given user.

As used herein, the term "item" may refer to any services or goods (such as products, content, and the like) with limited capacity or availability, including any vendors or providers of such goods or services. Example suitable items may include providers of e-commerce services, media streaming services, crowdsourcing services, or any other services which may provide personalized recommendations to its users. Similarly, the term "user" may refer to any consumer of such goods or services. Example users may include customers or clients of e-commerce services, media streaming services, crowdsourcing services, or users of various other recommendation services or platforms.

Various implementations of the subject matter disclosed herein provide one or more technical solutions to the technical problem of recommending items to users based on the tastes and preferences of the users. More specifically, various aspects of the present disclosure provide a unique computing solution to a unique computing problem that did not exist prior to electronic systems and services (such as e-commerce, media streaming, crowdsourcing services, and the like) that attempt to determine the tastes and preferences of its users, much less matching users with items based on the determined tastes and preferences. By recommending items to users based on the capacity of each item, the subject matter disclosed herein provide meaningful improvements to the performance of recommendation systems, and more specifically to ensuring user satisfaction while upholding the reputation of the vendors. As such, implementations of the subject matter disclosed herein are not an abstract idea such as organizing human activity or a mental process that can be performed in the human mind.

Moreover, various aspects of the present disclosure effect an improvement in the technical field of recommendation systems. The matching of users with items based on past interactions between the users and the items, much less the global optimization techniques that take into account both the capacity of each vendor and the preferences of other users in determining which vendors to recommend to a given user, cannot be performed in the human mind, much less using pen and paper. In addition, implementations of the subject matter disclosed herein do far more than merely create contractual relationships, hedge risks, mitigate settlement risks, and the like, and therefore cannot be considered a fundamental economic practice.

Figure 1:
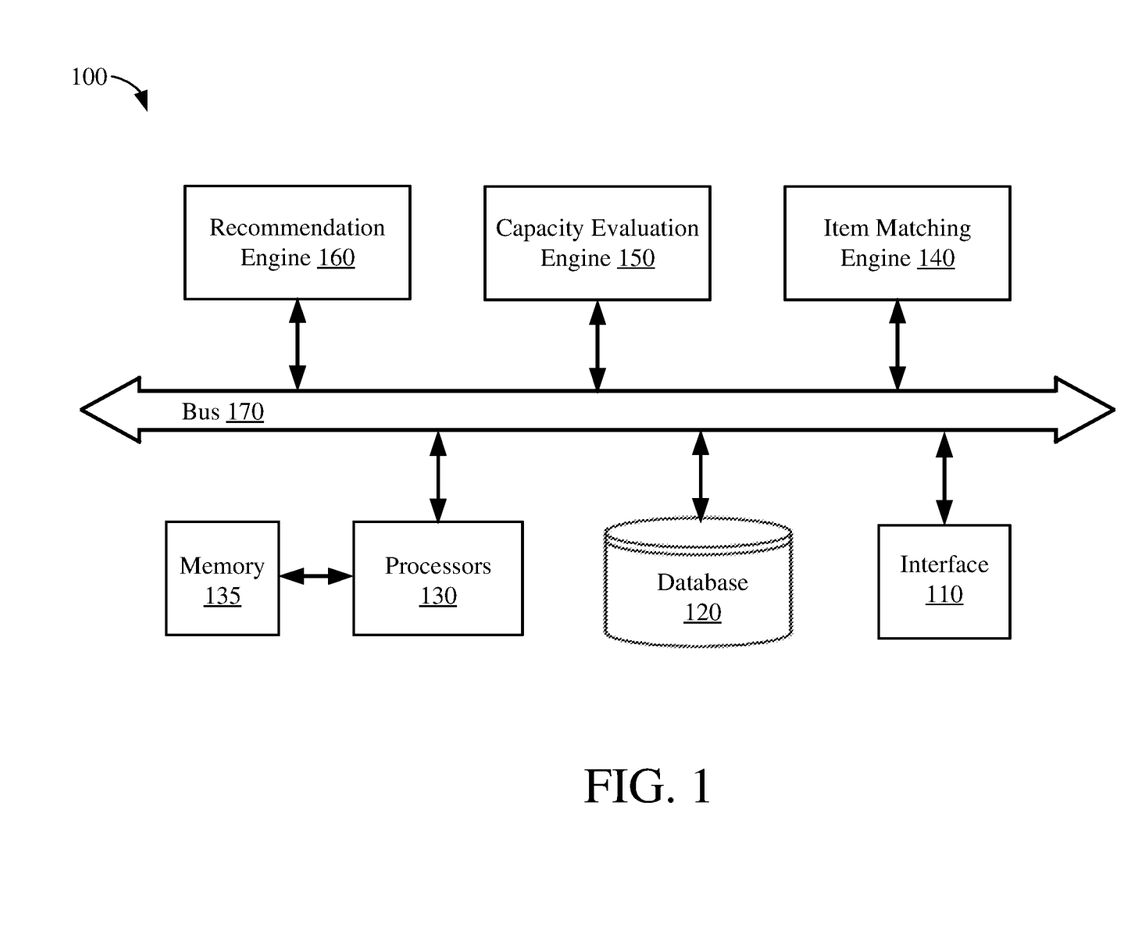
FIG. 1 shows an example recommendation system, according to some implementations.

FIG. 1 shows an example recommendation system 100, according to some implementations. Although described herein with respect to matching users with vendors or providers of content, products, or services, various aspects of the recommendation 100 disclosed herein may be generally applicable for recommending items with limited capacity or availability to users of a recommendation system. For example, constraining the recommendation operation based on the capacity of each item and the preferences of other users may produce globally optimized recommendations for any suitable item types. In other words, the resulting recommendations represent the highest matching user-item pairings across all users given the limited capacity or availability of each item.

The recommendation system 100 is shown to include an input/output (I/O) interface 110, a database 120, one or more data processors 130, a memory 135 coupled to the data processors 130, an item matching engine 140, a capacity evaluation engine 150, and a recommendation engine 160. In some implementations, the various components of the recommendation system 100 may be interconnected by at least a data bus 170, as depicted in the example of FIG. 1. In some other implementations, the various components of the recommendation system 100 may be interconnected using other suitable signal routing resources.

The interface 110 may include a screen, an input device, and other suitable elements that allow a user or other electronic system (not shown for simplicity) to provide information to the recommendation system 100 and/or to retrieve information from the recommendation system 100. Example information that can be provided to the recommendation system 100 may include data associated with interactions between users and items, capacity information (indicating a respective capacity of each item associated with the recommendation system 100), or a recommendation limit (such as a maximum number of items to recommend to each user). In some implementations, the data associated with the interactions between users and items may include explicit user feedback (such as user-submitted ratings based on the interactions). In some other implementations, the data associated with the interactions between users and items may include implicit user feedback (such as an indication of the frequency of interactions between each user-item pair). Example information that can be retrieved from the recommendation system 100 may include item recommendations, user preferences, matching levels between user-item pairs, and the like.

The database 120, which may represent any suitable number of databases, may store any suitable information pertaining to the users of the recommendation system 100, the items associated with the recommendation system 100, the determination of matching levels between the users and the items, the constraints for the recommendation system 100, and the generation of item recommendations for individual users. For example, the information may include a list of users, a list of items, data representative of past interactions between the users and the items, capacity information, a recommendation limit, contribution values representing preferences of the users for the items, and item recommendations for each user. In some implementations, the database 120 may be a relational database capable of presenting the data sets to a user in tabular form and capable of manipulating the data sets using relational operators. In some aspects, the database 120 may use Structured Query Language (SQL) for querying and maintaining the database.

The data processors 130, which may be used for general data processing operations (such as manipulating the datasets stored in the database 120), may be one or more suitable processors capable of executing scripts or instructions of one or more software programs stored in the recommendation system 100 (such as within the memory 135). The data processors 130 may be implemented with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 130 may be implemented as a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory) may store any number of software programs, executable instructions, machine code, algorithms, and the like that can be executed by the data processors 130 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The item matching engine 140 may be used for determining matching levels between users and items associated with the recommendation system 100. In some implementations, the item matching engine 140 may determine the matching levels based on data associated with historical interactions between the users and the items. Each matching level may be represented as a respective contribution value. More specifically, a contribution value may be any real number indicating a preference of a respective user for a respective item. In some aspects, the data associated with the historical interactions may include explicit feedback from the users. Example explicit user feedback may include, but is not limited to, star ratings, like/dislike buttons, and survey responses. For example, a user that had a positive experience with a particular item may provide positive feedback for that item. On the other hand, a user that had a negative experience with a particular item may provide negative feedback for that item. Accordingly, each contribution value may represent a degree to which a respective user prefers a respective item. For example, a higher user rating for a given item may be associated with a higher contribution value, which represents a greater preference for that item.

In some other aspects, the item matching engine 140 may determine the matching levels based on implicit user feedback associated with the historical interactions. For example, a user that frequently interacts with a given item is more likely to have a preference for that item. On the other hand, a user that interacts infrequently (or not at all) with a given item is less likely to have a preference for that item. Accordingly, each contribution value may represent a confidence level or likelihood that a respective user prefers a respective item. For example, a higher frequency of interaction with a given item may be associated with a higher contribution value, which represents a greater likelihood that a user prefers that item. In some implementations, the item matching engine 140 may use collaborative filtering techniques to determine the matching levels or contribution values associated with user-item pairings for which no previous interactions have occurred. For example, collaborative filtering may be used to infer the contribution values based on similarities between various items or users. Example suitable collaborative filtering techniques may include, but are not limited to, alternating least squares (ALS), Bayesian personalized ranking (BPR), and neural collaborative filtering.

The capacity evaluation engine 150 may be used for determining a capacity of each item associated with (or recognized by) the recommendation system 100. As described above, the capacity of a given item may be based on a maximum number of users the item can serve during a given period without becoming overloaded. An item may become overloaded if the demand for the item exceeds its bandwidth or supply. For example, a bakery that can produce at most 5 wedding cakes a day may become overloaded if it receives 6 or more wedding cake requests for any given day. Aspects of the present disclosure recognize that not all recommendations may result in future interactions between a user and an item. For example, an item may be recommended to 10 users, but only half (5) of those users may actually interact with the recommended item. Thus, in some aspects, the capacity evaluation engine 150 may determine the capacity of a given item to be a multiple (e.g., 1.5×) of the maximum number of users the item can actually serve. In some implementations, the capacity evaluation engine 150 may determine the capacity of each item based, at least in part, on capacity information provided by the items themselves. For example, each vendor or provider may specify or otherwise indicate the maximum number of users it can serve to the recommendation system 100.

In some other implementations, the capacity evaluation engine 150 may determine the capacity of each item based on interactions between users and items. For example, the capacity evaluation engine 150 may infer the maximum number of users each item can serve based on the data associated with the historical interactions between the users and the items (such as the data used by the item matching engine 140 in determining the matching levels between users and items). More specifically, in some aspects, the capacity evaluation engine 150 may infer the maximum number of users an item can serve based on the average number of users it currently serves. For example, a bakery that serves an average of 5 users a day can be expected to continue serving up to 5 users a day. Alternatively, the bakery can be projected to serve slightly fewer or slightly more than 5 users a day based on additional information associated with the interactions between users and items (such as explicit or implicit feedback). Thus, in some other aspects, the capacity evaluation engine 150 may infer the maximum number of users an item can serve by multiplying the average number of users it currently serves by a scaling factor or multiple.

The recommendation engine 160 may be used for recommending items to the users based, at least in part, on the matching levels or contribution values associated with each user-item pair and the capacities of the items. More specifically, the recommendation engine 160 may restrict the number of users to which each item is recommended based on the capacity of the item. In other words, the recommendation system 160 may not recommend a given item to more users than its capacity allows (during a given period of time). Because each item can only be recommended to a limited number of users, the recommendations generated for one user may depend on (or affect) the recommendations generated for other users. Thus, in some implementations, the recommendation engine 160 may implement a global approach to selecting the items to be recommended to each user. More specifically, the recommendation engine 160 may select the items that maximize the matching levels between user-item pairs across all users of the recommendation system 100 such that the number of times a given item is recommended does not exceed the capacity of that item.

In some implementations, the recommendation engine 160 may recommend only a limited number of items to each of the users. More specifically, in selecting the items to be recommended to each user, the recommendation engine 160 may further ensure that the number of items recommended to any given user does not exceed a recommendation limit. As used herein, the term "recommendation limit" may refer to a maximum number (K) of items that can be recommended to a user of the recommendation system 100. As a result, the recommendation engine 160 may select the K highest-matching items to be recommended to each of the users such that no item is recommended to more users than its capacity allows. In determining which items are to be recommended to which users given multiple system constraints, the recommendation engine 160 may implement one or more computational algorithms or techniques that are optimized for solving problems with multiple degrees of freedom. Example suitable techniques include, but are not limited to, the Greedy algorithm and the Monte Carlo method.

As described above, the recommendation engine 160 may selectively recommend items to users based on the capacity of each item and the items recommended to other users (referred to herein as a global approach). In contrast with conventional recommendation systems, the recommendation engine 160 may prevent any item from being recommended to more users than its respective capacity allows. This ensures that none of the items becomes overloaded by overwhelming demand. In other words, the recommendation engine 160 may reduce the likelihood that a vendor or provider of goods or services will be faced with a decision to either reject some of the demand for its goods or services or sacrifice the quality of its goods or services to meet the demand. This may result in higher user satisfaction and a greater potential for repeat business for the vendors.

The particular architecture of the recommendation system 100 shown in FIG. 1 is but one example of a variety of different architectures within which aspects of the present disclosure may be implemented. For example, in some other implementations, the recommendation system 100 may not include an item matching engine 140, the functions of which may be implemented by the processors 130 executing corresponding instructions or scripts stored in the memory 135. In some other implementations, the capacity evaluation engine 150 may be replaced by capacity information stored as data in the database 120. For example, the capacity information may be provided directly by the users themselves. Still further, in some implementations, the functions of the recommendation engine 160 may be performed by the processors 130 executing corresponding instructions or scripts stored in the memory 135.

Figure 2:
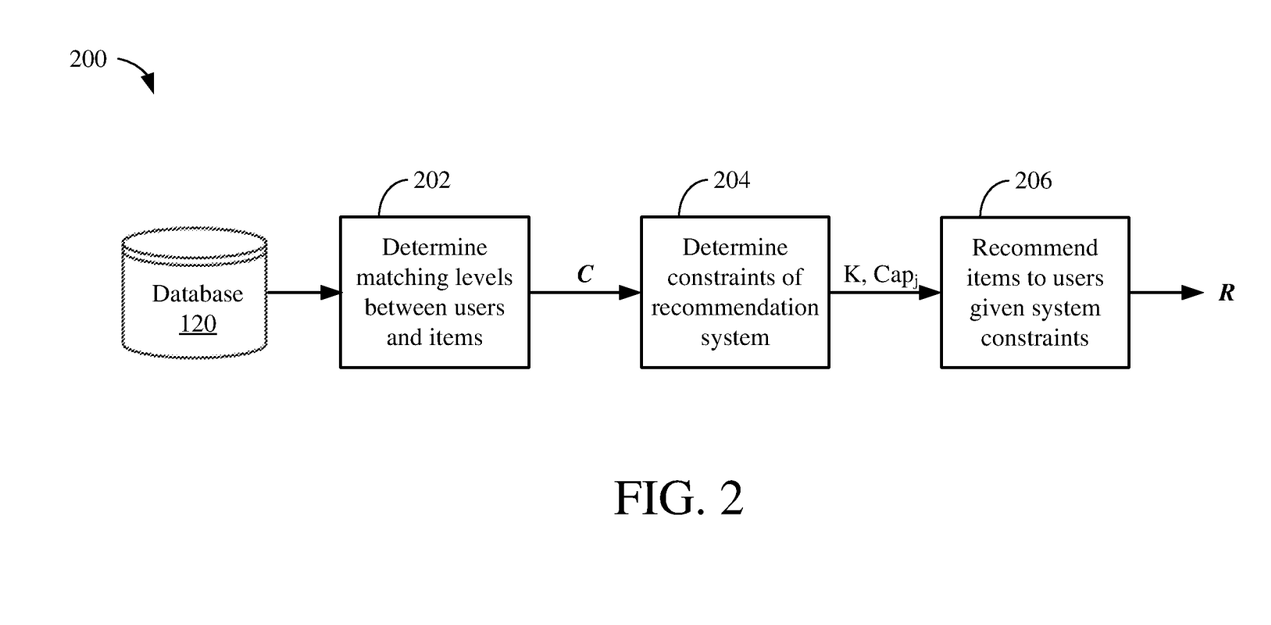
FIG. 2 shows an example process flow that may be employed by the recommendation system of FIG. 1, according to some implementations.

FIG. 2 shows a high-level overview of an example process flow 200 that may be employed by the recommendation system 100 of FIG. 1. More specifically, the process flow 200 depicts an example operation for recommending items to users of the recommendation system 100.

At block 202, matching levels are determined for each user-item pair. The matching levels may be determined based on data associated with historical interactions between the users and the items. Such data may include explicit user feedback or implicit user feedback. In some implementations, at least some of the matching levels may be determined or inferred using collaborative filtering techniques (such as ALS, BPR, neural collaborative filtering, and the like). Each matching level may be represented by a respective contribution value ($c_{ij}$) indicating a preference of a respective user (i) for a respective item (j). In some implementations, each contribution value $c_{ij}$ may represent a degree to which user i prefers item j. In some other implementations, each contribution value $c_{ij}$ may represent a likelihood or confidence level that user i prefers item j. Each contribution value $c_{ij}$ may correspond to a respective entry of a contribution matrix (C), where each row of the contribution matrix C represents a respective user i and each column of the contribution matrix C represents a respective item j.

At block 204, one or more constraints of the recommendation system 100 are determined. Example constraints include a recommendation limit (K) and a respective capacity ($Cap_j$) of each of the items (j). As described above, the recommendation limit K may represent the maximum number of items that can be recommended to a user of the recommendation system 100. In some implementations, the recommendation limit K may be a predefined parameter associated with the recommendation system 100. On the other hand, the capacity $Cap_j$ of item j represents the maximum number of users to which item j can be recommended (or the maximum number of times item j can be recommended). In some implementations, the capacity evaluation engine 150 may determine the capacity $Cap_j$ of item j based on a maximum number of users item j can serve during a given period of time (as described above with respect to FIG. 1). For example, the capacity $Cap_j$ may be a multiple (e.g., 1.5×) of the maximum number of users that can be served by item j.

At block 206, items are recommended to each of the users given the system constraints. In some implementations, the recommendation engine 160 may select the K highest-matching items to be recommended to each of the users such that no item is recommended to more users than its capacity $Cap_j$ allows. For example, the user-item recommendations may be expressed as a Boolean recommendation matrix (R), where each entry ($r_{ij}$) of the recommendation matrix R is a Boolean value (0 or 1) representing whether item j is recommended to user i. In some implementations, the recommendation engine 160 may compute the recommendation matrix R for users i and items j such that the entries $r_{ij}$ satisfy the following conditions:

$$\operatorname{argmax}_{\{r_{ij}\}} \sum_{i,j} c_{ij} r_{ij}$$

such that $$\forall j \sum_{i} r_{ij} \leq Cap_j$$

such that $$\forall i \sum_j r_{ij} \le K$$

Aspects of the present disclosure recognize that there may be multiple techniques for solving the above equations. More specifically, different techniques may yield slightly different solutions for $\{r_{ij}\}$. In some implementations, the recommendation engine 160 may solve the above equations using the Monte Carlo method. In some other implementations, the recommendation engine 160 may solve the above equations using the Greedy algorithm. For example, the recommendation engine 160 may perform the recommendation operation over multiple iterations. More specifically, the recommendation engine 160 may iteratively select a user-item pairing that maximizes the contribution value $c_{ij}$ at each iteration of the recommendation operation. As described in greater detail with respect to FIGS. 3A-3F, the selection process can be demonstrated with respect to a bipartite graph, where each of the users i is depicted as a respective node on one axis and each of the items j is depicted as a respective node on the other axis.

FIGS. 3A-3F show bipartite graphs 300-350, respectively, depicting an example operation for recommending items to users, according to some implementations. As shown in FIGS. 3A-3F, a first set of nodes U1-U3 is depicted on the upper axis of each of the bipartite graphs 300-350 and a second set of nodes I1-I5 is depicted on the lower axis of each of the bipartite graphs 300-350. Each of the nodes U1-U3 on the upper axis represents a respective user and each of the nodes I1-I5 on the lower axis represents a respective item. Although three users and five items are depicted in the example of FIGS. 3A-3F, in other implementations, the recommendation operation can be performed with any number of users and any number of items.

The edges connecting the upper nodes with the lower nodes represent matching levels for each user-item pair. As shown in FIGS. 3A-3F, some edges are labeled with respective weights representing a contribution value for that user-item pair. For simplicity, only the edges associated with contribution values greater than or equal to 1 are labeled. Edges that are associated with contribution values less than 1 are shown in phantom. In some aspects, the bipartite graphs 300-350 may be a graphical representation of an example contribution matrix (C):

$$C(i,j) = \begin{bmatrix} 5 & 2 & 1 & 0.2 & 0.7 \\ 3 & 1 & 0.6 & 0.1 & 4 \\ 0.1 & 0.1 & 1 & 0.8 & 0.2 \end{bmatrix}$$

In the example of FIGS. 3A-3F, the recommendation operation has a recommendation limit equal to 2 (e.g., K=2). In other words, each of the users U1-U3 can be recommended a maximum of two items. Each odd-numbered item I1, I3, and I5 has a capacity equal to 1 (e.g., $Cap_1 = Cap_3 = Cap_5 = 1$) and each even-numbered item I2 and I4 has a capacity equal to 2 (e.g., $Cap_2 = Cap_4 = 2$). In other words, each of the odd-numbered items I1, I3, and I5 can be recommended to a maximum of one user and each of the even-numbered items I2 and I4 can be recommended to a maximum of two users. A remaining capacity ($R\_Cap_j$) is shown below each item node to indicate a remaining number of users to which that item can be recommended. As illustrated in FIGS. 3A-3F, the recommendation operation iteratively selects the highest-matching user-item pair. When a user has been matched with a number (n) of items equal to the recommendation limit (e.g., n=K), the corresponding user node is removed from the bipartite graph and all edges connected to that user node are also removed. Similarly, when an item (j) has been matched with a number (m) of users equal to the capacity of that item (e.g., m=$Cap_j$), the corresponding item node is removed from the bipartite graph and all edges connected to that item node are also removed.

Figure 3A:
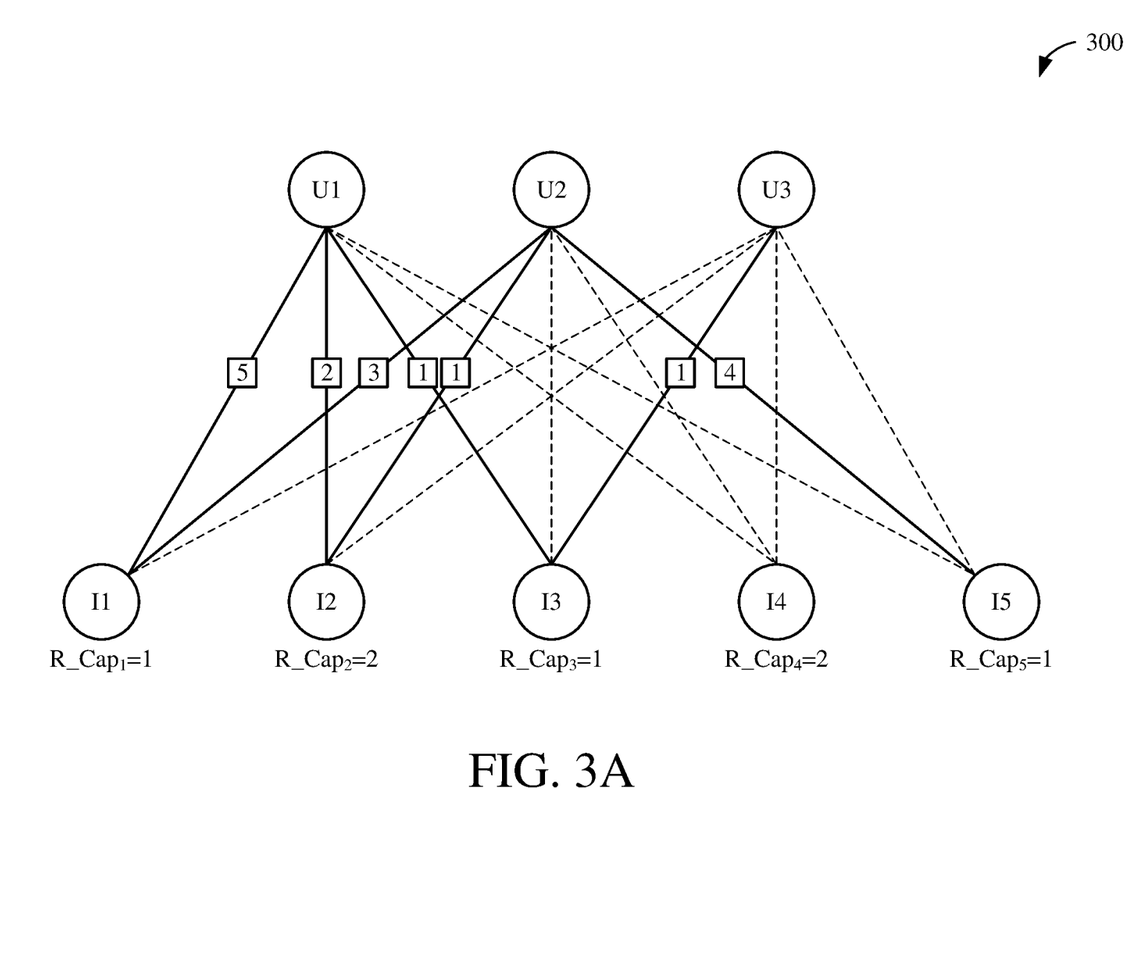
FIGS. 3A-3F show bipartite graphs depicting an example operation for recommending items to users, according to some implementations.

FIG. 3A shows a first iteration of the example recommendation operation. As shown in FIG. 3A, the edge connecting user node U1 with item node I1 represents the highest contribution value (5) among the contribution values depicted in the bipartite graph 300. Accordingly, the item associated with item node I1 is selected as the best match for the user associated with user node U1 given the constraints of the recommendation operation. As a result of the selection, the item associated with item node I1 will have reached its capacity (e.g., $R\_Cap_1=0$). Thus, item node I1 will be subsequently removed from the bipartite graph, and all edges connected to item node I1 will also be removed, for example, as shown in FIG. 3B.

Figure 3B:
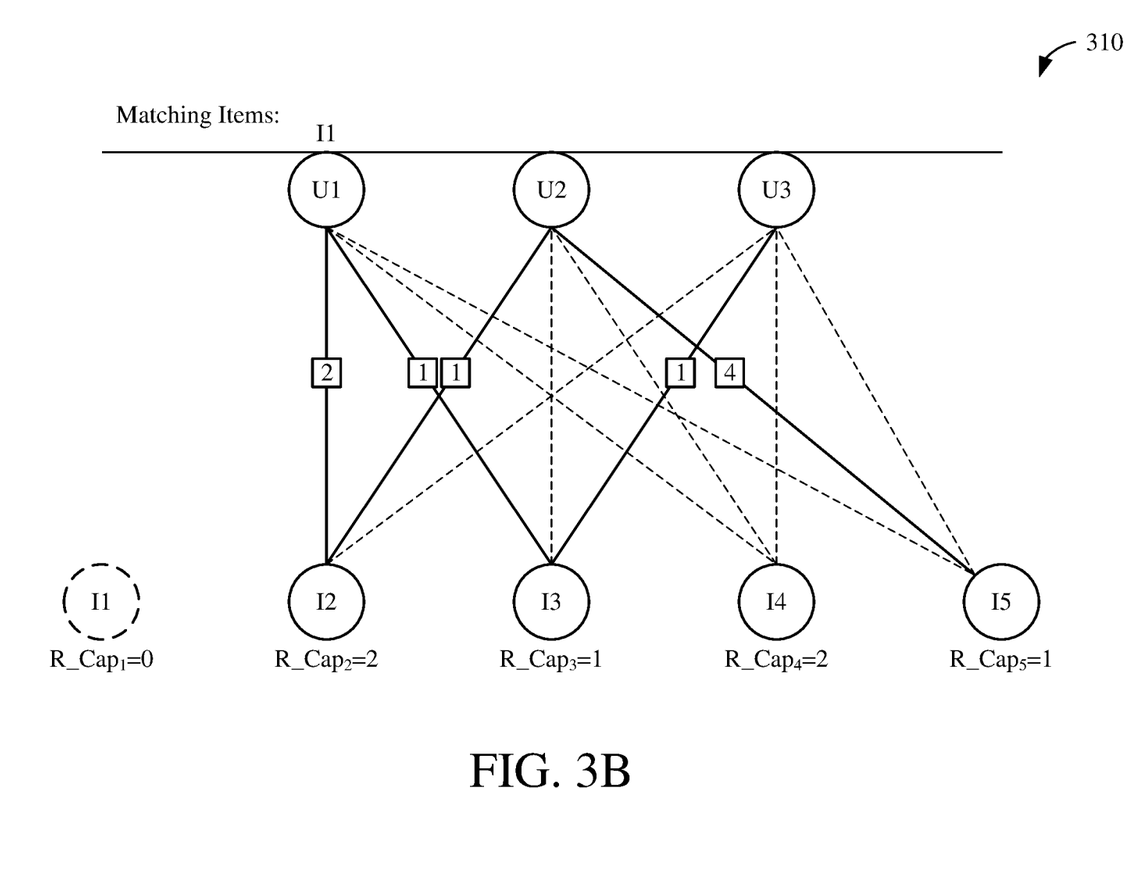

FIG. 3B shows a second iteration of the example recommendation operation. As shown in FIG. 3B, the edge connecting user node U2 with item node I5 represents the highest contribution value (4) among the remaining recontribution values depicted in the bipartite graph 310. Accordingly, the item associated with item node I5 is selected as the best match for the user associated with user node U2 given the constraints of the recommendation operation. As a result of the selection, the item associated with item node I5 will have reached its capacity (e.g., $R\_Cap_5=0$). Thus, item node I5 will be subsequently removed from the bipartite graph, and all edges connected to item node I5 will also be removed, for example, as shown in FIG. 3C.

Figure 3C:
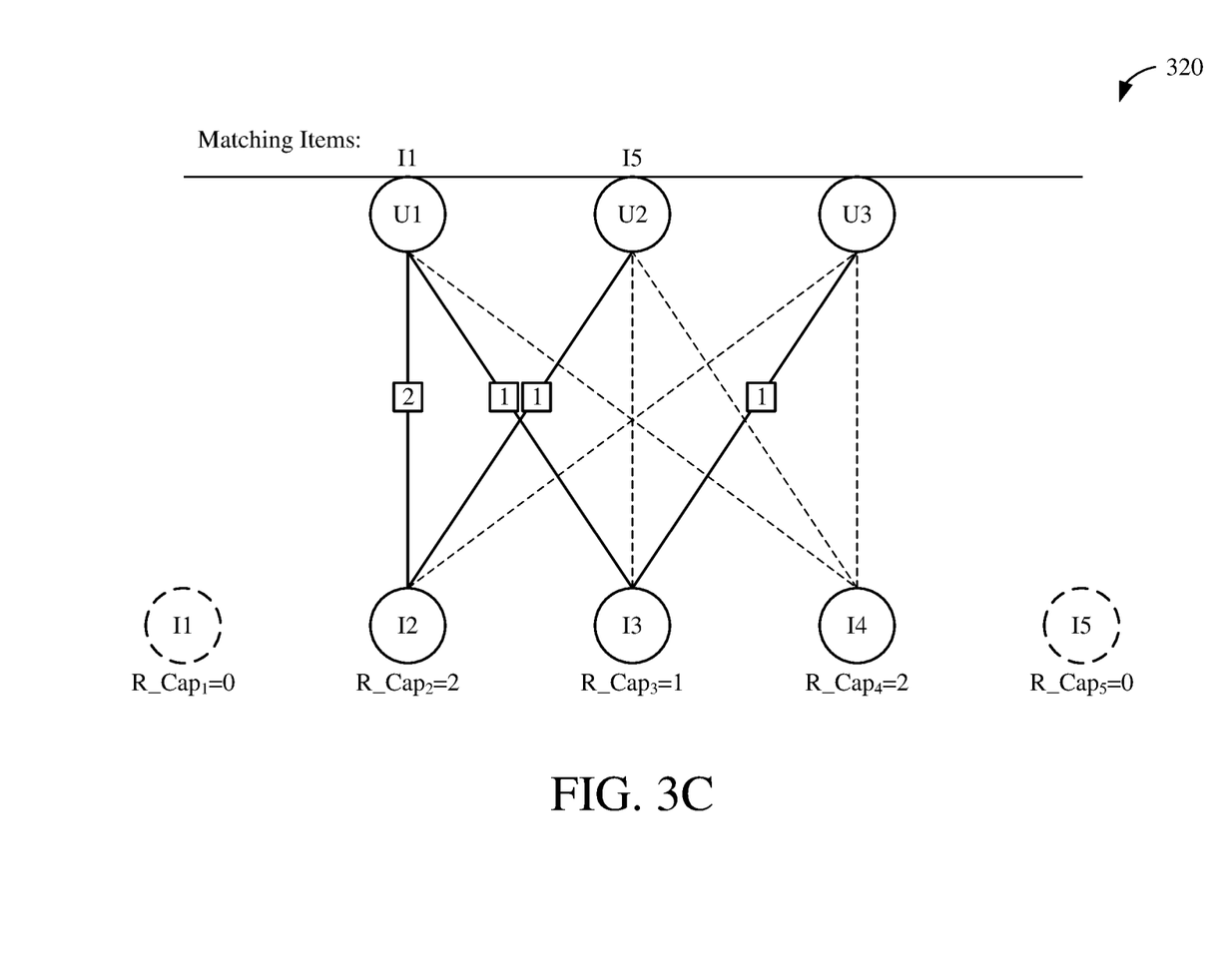

FIG. 3C shows a third iteration of the example recommendation operation. As shown in FIG. 3C, the edge connecting user node U1 with item node I2 represents the highest contribution value (2) among the remaining contribution values depicted in the bipartite graph 320. Accordingly, the item associated with item node I2 may be selected as the next best match for the user associated with user node U1 given the constraints of the recommendation operation. As a result of the selection, the user associated with user node U1 will have reached the recommendation limit and the item associated with item node I2 will have a remaining capacity equal to 1 (e.g., $R\_Cap_2=1$). Thus, user node U1 will be subsequently removed from the bipartite graph, and all edges connected to user node U1 will also be removed, for example, as shown in FIG. 3D.

Figure 3D:
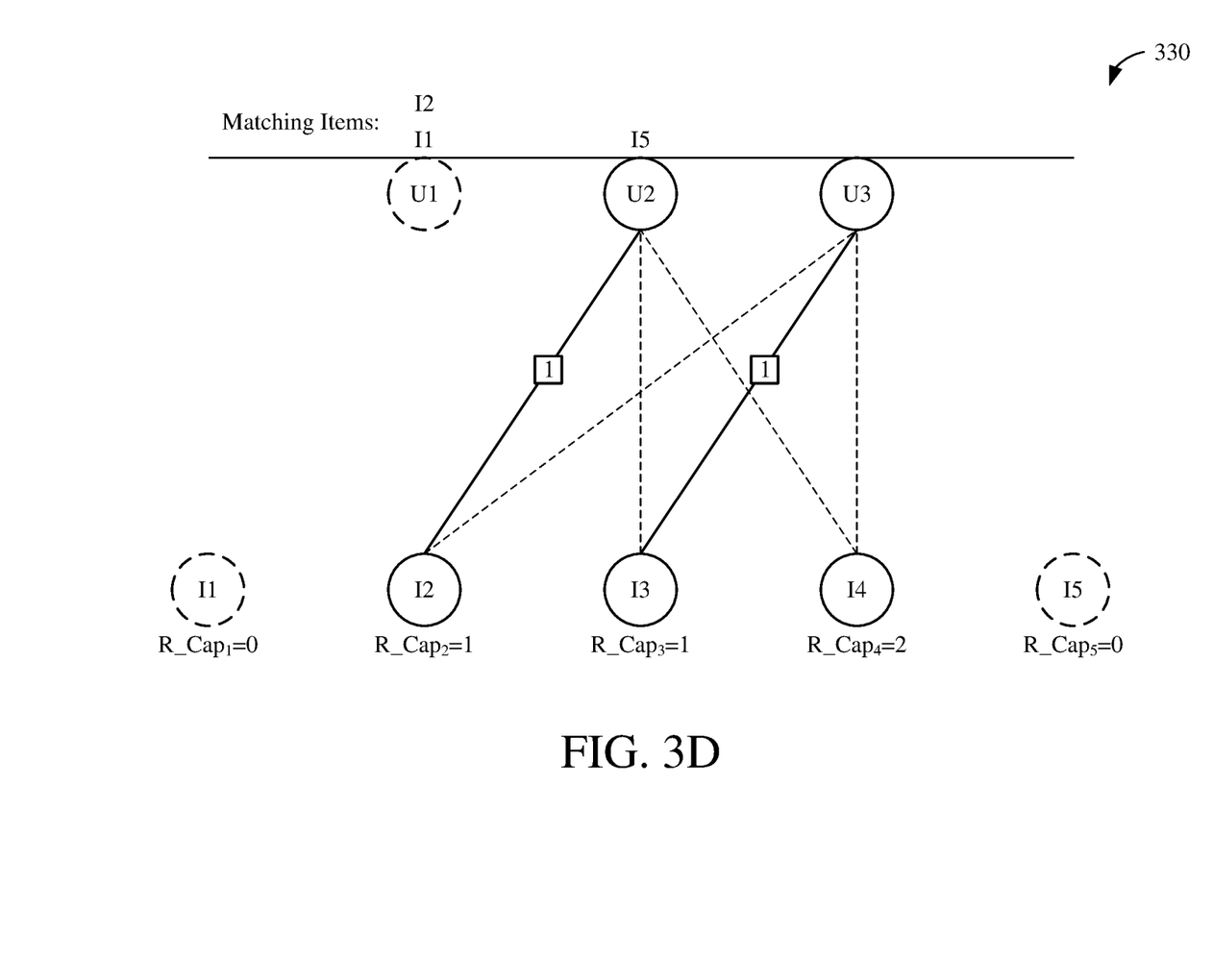

FIG. 3D shows a fourth iteration of the example recommendation operation. As shown in FIG. 3D, the edges connecting user nodes U2 and U3 with item nodes I2 and I3, respectively, represent the highest contribution values (1) among the remaining contribution values depicted in the bipartite graph 330. In the example of FIG. 3D, the item associated with item node I2 is selected as the next best match for the user associated with user node U2 given the constraints of the recommendation operation. As a result of the selection, the user associated with user node U2 will have reached the recommendation limit and the item associated with item node I will have reached its capacity (e.g., $R\_Cap_2=0$). Thus, user node U2 and item node I2 will be subsequently removed from the bipartite graph, and all edges connected to user node U2 and item node I2 will also be removed, for example, as shown in FIG. 3D.

Figure 3E:
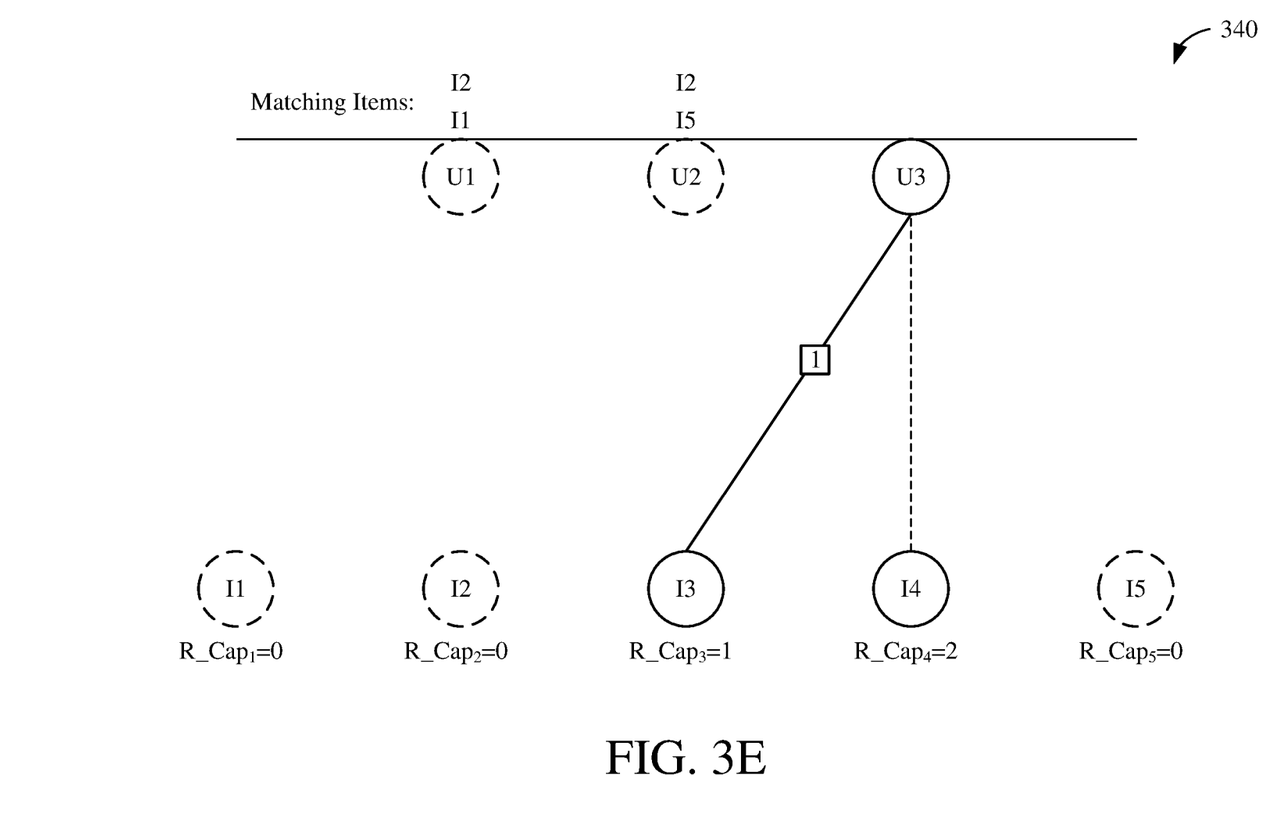
Figure 3F:
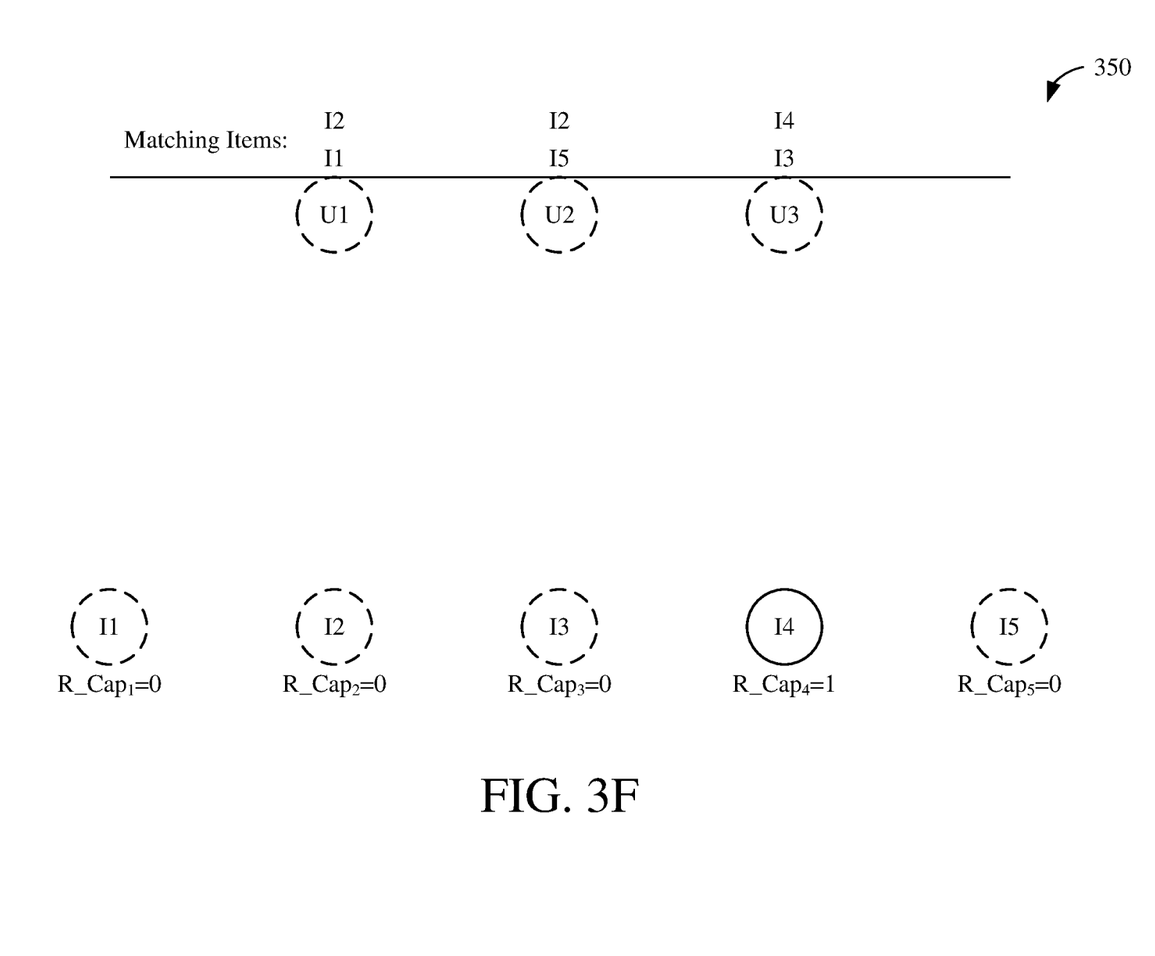

FIG. 3E shows a fifth and final iteration of the example recommendation operation. As shown in FIG. 3E, user node U3 and item nodes I3 and I4 are the only remaining nodes in the bipartite graph 340. Accordingly, the items associated with item nodes I3 and I4 may be selected as the best matches for the user associated with user node U3 given the constraints of the recommendation operation. As a result of the selection, the user associated with user node U3 will have reached the recommendation limit, the item associated with item node I3 will have reached its capacity (e.g., $R\_Cap_3=0$), and the item associated with item node I4 will have a remaining capacity equal to 1 (e.g., $R\_Cap_4=1$), as shown in the bipartite graph 350 depicted in FIG. 3F.

Figure 4:
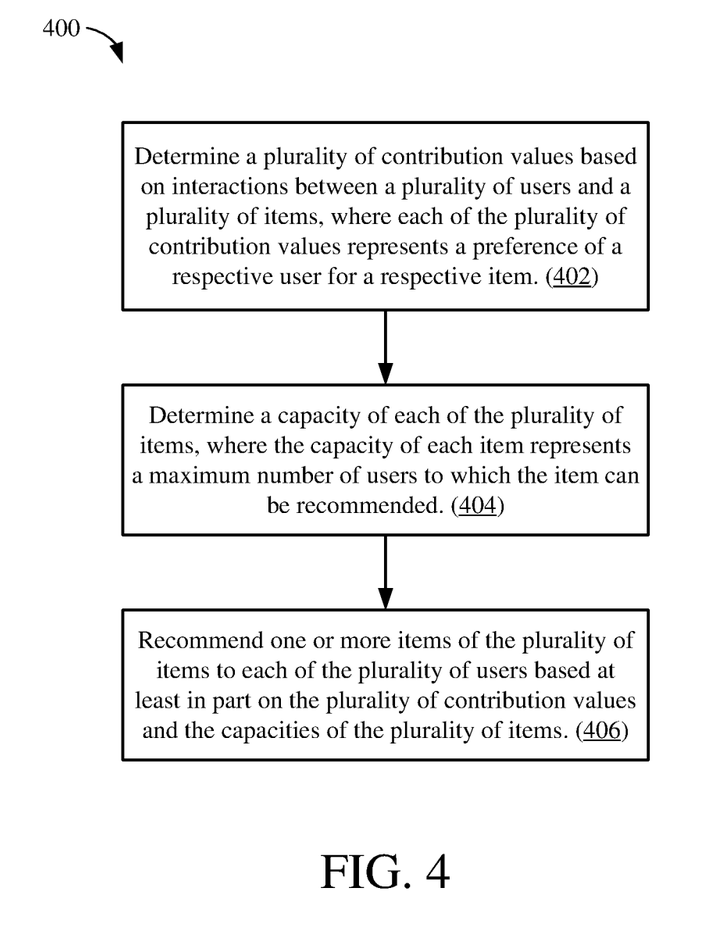
FIG. 4 shows an illustrative flow chart depicting an example operation for recommending items to users, according to some implementations.

FIG. 4 shows an illustrative flow chart depicting an example operation 400 for recommending items to users, according to some implementations. The example operation 400 may be performed by one or more processors of a recommendation system. In some implementations, the example operation 400 may be performed using the recommendation system 100 of FIG. 1. However, it is to be understood that the example operation 400 may be performed by other suitable systems, computers, or servers.

At block 402, the recommendation system 100 determines a plurality of contribution values based on interactions between a plurality of users and a plurality of items, where each of the plurality of contribution values represents a preference of a respective user for a respective item. At block 404, the recommendation system 100 determines a capacity of each of the plurality of items, where the capacity of each item represents a maximum number of users to which the item can be recommended. At block 406, the recommendation system 100 recommends one or more items of the plurality of items to each of the plurality of users based at least in part on the plurality of contribution values and the capacities of the plurality of items.

In some implementations, the determining of the plurality of contribution values may include receiving data associated with the interactions between the plurality of users and the plurality of items, and performing collaborative filtering on the received data to determine the plurality of contribution values. For example, the received data may include implicit feedback from the plurality of users. In some implementations, the determining of the capacity of each item may include receiving, for each of the plurality of items, a respective indication of the capacity of the item. In some other implementations, the capacity of each item may be determined based at least in part on the interactions between the item and the plurality of users. Still further, in some implementations, the determining of the capacity of each item may include determining, for each of the plurality of items, a number of users served by the item, where the capacity of each item is determined based on the number of users served by the item.

In some implementations, the recommending of the one or more items to each of the plurality of users may include determining a recommendation limit associated with the recommendation system, where the recommendation limit represents a maximum number of items that can be recommended to each of the plurality of users, and selecting the one or more items to be recommended to each user based on the plurality of contribution values, the capacities of the plurality of items, and the recommendation limit. For example, the selection may maximize the contribution values associated with each user such that a number of items recommended to each user is less than or equal to the recommendation limit and a number of users to which each item is recommended is less than or equal to the capacity of the item. In some aspects, the selection may be performed using a Greedy algorithm. In some other aspects, the selection may be performed using a Monte Carlo method.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method for recommending items to users of a recommendation system based on preferences of the users and inferred capacities of the items, the method performed by one or more processors of a recommendation system and comprising:
   determining, using an item matching engine of the recommendation system, a contribution value for each of a plurality of user-item pairs, each of the contribution values representing a likelihood that a given user prefers a given item based on historical data representative of one or more historical interactions between the given user and the given item, and each of the items being a good, a service, content, or a vendor or provider of a good, a service, or content;
   determining, for each of the items, an average number of users historically served by the item during a recurring time period;
   inferring, for each of the items, using a capacity evaluation engine of the recommendation system, a current capacity of the item based on the determined average number of users historically served by the item, the current capacity representing a projected maximum number of users to which the item can be recommended within the recurring time period;
   iteratively selecting, using a multi-degree-of-freedom algorithm one or more of the items for a specific user, the multi-degree-of-freedom algorithm updated, at each iteration of the selection, for maximizing the contribution values associated with the selected items until the selected items represent a highest matching user-item pairing that prevents the items from being recommended more than the items' current capacities allow across users globally; and
   recommending, using a recommendation engine of the recommendation system, the iteratively selected items to the specific user.

2. The method of claim 1, wherein the determining of the contribution values comprises:
   receiving data associated with the one or more historical interactions; and
   performing collaborative filtering on the received data, wherein the collaborative filtering is performed using at least one of an alternating least squares (ALS) technique, a Bayesian personalized ranking (BPR) technique, or a neural collaborative filtering technique.

3. The method of claim 2, wherein the received data comprises implicit feedback from the users associated with the one or more historical interactions.

4. The method of claim 1, further comprising:
   determining a recommendation limit representing a maximum number of items that can be recommended to each user; and
   selecting the one or more items further based on the recommendation limit.

5. The method of claim 4, wherein the one or more items are selected such that a quantity of the one or more items is less than or equal to the recommendation limit determined for the specific user and such that a number of users to which each respective item of the one or more items is recommended is less than or equal to the current capacity inferred for the respective item.

6. The method of claim 1, wherein the multi-degree-of-freedom algorithm includes a Greedy algorithm.

7. The method of claim 1, wherein the multi-degree-of-freedom algorithm includes a Monte Carlo method.

8. The method of claim 1, wherein the iterative selecting is performed using a bipartite graph including at least a first axis and a second axis, wherein the first axis includes a number of nodes each representative of one of the users and the second axis includes a number of nodes each representative of one of the items.

9. The method of claim 8, wherein the bipartite graph further includes a number of edges each connecting one of the nodes on the first axis and one of the nodes on the second axis, wherein each edge represents a matching level for the user-item pair associated with the pair of nodes, and wherein the highest matching user-item pairing is determined based on the matching levels represented by the edges.

10. A recommendation system, comprising:
    one or more processors; and
    a memory storing instructions that, when executed by the one or more processors, causes the recommendation system to perform operations including:
        determining, using an item matching engine of the recommendation system, a contribution value for each of a plurality of user-item pairs, each of the contribution values representing a likelihood that a given user prefers a given item based on historical data representative of one or more historical interactions between the given user and the given item, and each of the items being a good, a service, content, or a vendor or provider of a good, a service, or content;
        determining, for each of the items, an average number of users historically served by the item during a recurring time period;
        inferring, for each of the items, using a capacity evaluation engine of the recommendation system, a current capacity of the item based on the determined average number of users historically served by the item, the current capacity representing a projected maximum number of users to which the item can be recommended within the recurring time period;
        iteratively selecting, using a multi-degree-of-freedom algorithm, one or more of the items for a specific user, the multi-degree-of-freedom algorithm updated, at each iteration of the selection, for maximizing the contribution values associated with the selected items until the selected items represent a highest matching user-item pairing that prevents the items from being recommended more than the items' current capacities allow across users globally; and recommending, using a recommendation engine of the recommendation system, the iteratively selected items to the specific user.

11. The recommendation system of claim 10, wherein execution of the instructions for determining the contribution values causes the recommendation system to perform operations further comprising:
receiving data associated with the one or more historical interactions; and
performing collaborative filtering on the received data, wherein the collaborative filtering is performed using at least one of an alternating least squares (ALS) technique, a Bayesian personalized ranking (BPR) technique, or a neural collaborative filtering technique.

12. The recommendation system of claim 11, wherein the received data comprises implicit feedback from the users associated with the one or more historical interactions.

13. The recommendation system of claim 10, wherein execution of the instructions causes the recommendation system to perform operations further comprising:
determining a recommendation limit representing a maximum number of items that can be recommended to each user; and
selecting the one or more items further based on the recommendation limit.

14. The recommendation system of claim 13, wherein the one or more items are selected such that a quantity of the one or more items is less than or equal to the recommendation limit determined for the specific user and such that a number of users to which each respective item of the one or more items is recommended is less than or equal to the current capacity inferred for the respective item.

15. The recommendation system of claim 10, wherein the multi-degree-of-freedom algorithm includes a Greedy algorithm or a Monte Carlo method.

16. The recommendation system of claim 10, wherein the iterative selecting is performed using a bipartite graph including at least a first axis and a second axis, wherein the first axis includes a number of nodes each representative of one of the users and the second axis includes a number of nodes each representative of one of the items.

17. The recommendation system of claim 16, wherein the bipartite graph further includes a number of edges each connecting one of the nodes on the first axis and one of the nodes on the second axis, wherein each edge represents a matching level for the user-item pair associated with the pair of nodes, and wherein the highest matching user-item pairing is determined based on the matching levels represented by the edges.

18. A non-transitory computer-readable medium storing instructions that, when executed by one or more processors of a system, cause the system to perform operations including:
determining, using an item matching engine of the recommendation system, a contribution value for each of a plurality of user-item pairs, each of the contribution values representing a likelihood that a given user prefers a given item based on historical data representative of one or more historical interactions between the given user and the given item, and each of the items being a good, a service, content, or a vendor or provider of a good, a service, or content;
determining, for each of the items, an average number of users historically served by the item during a recurring time period;
inferring, for each of the items, using a capacity evaluation engine of the recommendation system, a current capacity of the item based on the determined average number of users historically served by the item, the current capacity representing a projected maximum number of users to which the item can be recommended within the recurring time period;
iteratively selecting, using a multi-degree-of-freedom algorithm, one or more of the items for a specific user, the multi-degree-of-freedom algorithm updated, at each iteration of the selection, for maximizing the contribution values associated with the selected items until the selected items represent a highest matching user-item pairing that prevents the items from being recommended more than the items' current capacities allow across users globally; and
recommending, using a recommendation engine of the recommendation system, the iteratively selected items to the specific user.

19. The computer-readable medium of claim 18, wherein the multi-degree-of-freedom algorithm includes a Greedy algorithm or a Monte Carlo method.

20. The computer-readable medium of claim 18, wherein the iterative selecting is performed using a bipartite graph including at least a first axis and a second axis, wherein the first axis includes a number of nodes each representative of one of the users and the second axis includes a number of nodes each representative of one of the items, wherein the bipartite graph further includes a number of edges each connecting one of the nodes on the first axis and one of the nodes on the second axis, wherein each edge represents a matching level for the user-item pair associated with the pair of nodes, and wherein the highest matching user-item pairing is determined based on the matching levels represented by the edges.

* * * * *